United States Patent Office 3,423,426
Patented Jan. 21, 1969

3,423,426
N-(POLYHALOALKYLTHIO) ALKENYL-SUCCINIMIDES
Gustave K. Kohn, Berkeley, Calif., assignor to Chevron Research Company, San Francisco, Calif., a corporation of Delaware
No Drawing. Filed Jan. 25, 1966, Ser. No. 522,852
U.S. Cl. 260—326.5           5 Claims
Int. Cl. C07d 27/10; A01n 9/22

ABSTRACT OF THE DISCLOSURE

N-(polyhaloalkylthio)-2-alkenylsuccinimide in which the polyhaloalkyl group is of 1 to 2 carbon atoms and at least 3 halogen atoms, at least one of said halogens being bonded to the alpha carbon atom, and the alkenyl group is of 3 to 6 carbon atoms. These succinimides are useful as fungicides.

This invention is directed to N-(polyhaloalkylthio) alkenylsuccinimides and their use as fungicides.

N-(polyhaloalkylthio) unsubstituted succinimides are known fungicides. The trihalomethyl compounds were known first. They were followed by a series of other succinimides having improved fungicidal activity. All of these other succinimides differed from the trihalomethyl compounds in their polyhaloalkyl groups. Variation in the aliphatic chain between the carbonyl groups, e.g., the glutarimide and maleimide, decreased the fungicidal activity.

A new group of N-(polyhaloalkylthio) succinimides has now been found which are superior to known succinimides against certain fungi such as *Alternaria solani* and *Monilinia fructicola*. These unique compounds are N-(polyhaloalkylthio)-2-alkenylsuccinimides in which the polyhaloalyl group contains 1 to 2 carbon atoms and at least 3 halogen atoms, at least one of which is bonded to the alpha carbon atom, and the alkenyl group has 3 to 6 carbon atoms. Halogens are of atomic number 17 to 35, preferably 17. Preferred compounds are N-(1,1,2,2-tetrachloroethylthio)-2-alkenylsuccinimides, wherein the alkenyl group has 3 to 6 carbon atoms. A particularly preferred compound is N-(1,1,2,2-tetrachloroethylthio)-2-allylsuccinimide.

Examples of other compounds within this invention are: N-(trichloromethylthio)-2-allylsuccinimide, N-(tribromomethylthio)-2-(1-methyl-2-butenyl)-succinimide, N-(2-bromo-1,2,2-trichloroethylthio)-2-allylsuccinimide, N-(1,1,2,2-tetrachloroethylthio)-2-(2-butenyl)-succinimide N-(perchloroethylthio)-2-(1-methyl-2-butenyl)-succinimide, N-(1,1,2,2-tetrachloroethylthio)-2-(1-pentyl)-succinimide, N-(1,1,2,2-tetrachloriethylthio)-2-(1-hexenyl)-sucinimide, etc.

These N-(polyhaloalkylthio)-2-alkenylsuccinimides are made by reacting an alkali metal salt of a 2-alkenylsuccinimide with a polyhalomethyl or ethyl sulfenyl halide. The reaction between sulfenyl halides and succinimides is well known. Usually a solution of the desired sulfenyl halide in an inert solvent is added with vigorous stirring to a solution or suspension of the imide salt. Suitable solvents for the imide are benzene, toluene, ketones, ethers or water. Solvents for the sulfenyl halide are petroleum ether or mixed hexenes. For best results the reaction is carried out at 0 to 25° C.

The easiest way to make the alkenylsuccinimide precursor is by reacting the corresponding alkenylsuccinic anhydride with ammonia at about 175–250° C. The anhydride can be made by condensing olefins with maleic anhydride.

The folowing examples illustrate the compounds of this invention and how they can be made. These examples are offered only to illustrate and are not intended to limit the invention described herein.

EXAMPLE 1

To an ice-water suspension of 5 g. of 2-allylsuccinimide in a Waring Blendor was added an aqueous solution of 1.8 g. of NaOH. To the formed solution was then added 8.7 g. of 1,1,2,2-tetrachloroethyl sulfenyl chloride in about 20 ml. of mixed hexanes. The mixture was stirred for 10 minutes and filtered. The yellowish precipitate was washed with water then with mixed hexanes and dried, giving 5.5 g. of N-(1,1,2,2-tetrachloroethylthio)-2-allylsuccinimide. It melted at 61.5–62.5° C. Its Cl analysis was: Percent found—41.18; percent calculated—42.08.

EXAMPLE 2

To an ice-water suspension of 5 g. of 2-allylsuccinimide in a Waring Blendor was added an aqueous solution of 1.6 g. of NaOH followed by a solution of 6.8 g. of perchloromethylmercaptan in approximately 20 ml. of mixed hexanes. The mixture was stirred for 10 minutes, filtered and washed with $H_2O$, then with mixed hexanes yielding 5.3 g. of N-(trichloromethylthio)-2-allylsuccinimide, melting at 63–65° C. Its chlorine analysis was: Percent found—3642; percent caluclated—36.86.

EXAMPLE 3

To an ice-water suspension of 7.1 g. of 2-(1-methyl-2-butenyl) succinimide in a Waring Blendor was added an aqueous solution of 2.5 g. of NaOH (excess) followed by a solution of 10 g. of 1,1,2,2-tetrachloroethyl sulfenyl chloride in about 25 ml. of mixed hexanes. The mixture was stirred for 10 minutes and filtered. The filtrate was allowed to stand for 45 minutes and then extracted with ether. The ether extract was dried over anhydrous $MgSO_4$, filtered and evaporated to dryness. The residue, a viscous amber liquid weighing 7.5 g., was found to be (N-(1,1,2,2-tetrachloroethylthio)-2-(1-methyl-2-butenyl) succinimide. Its Cl analysis was: percent found—36.92; percent calculated—38.80.

EXAMPLE 4

To an ice-water suspension of 5.1 g. of 2-(1-hexenyl) succinimide in a Waring Blendor was added an aqueous solution of 2.5 g. of NaOH followed by a solution of 6.7 g. of 1,1,2,2-tetrachloroethyl sulfenyl chloride in approximately 20 ml. of hexane. The mixture was stirred for 10 minutes and filtered, washed with water then with mixed hexanes. The dry product, N-(1,1,2,2-tetrachloroethylthio)-2-(1-hexenyl) succinimide, weighed 1.2 g. and melted at 53–56° C. Its Cl analysis was: percent found—36.42; percent calculated—37.40.

The alkenylsuccinimides of this invention may be used in fungitoxic quantities to control or kill fungi. They are particularly effective against *Monilina fructcola*, *Alternara solani* and *Fusarium Solani* spores.

The fungicidal activity of these compounds is shown by the following tests:

Each compound to be tested was dissolved in acetone to a concentration of 1 p.p.m. These solutions were then pipetted into the walls of depression slides and allowed to dry. The wells were filled with a spore suspension of *Monilinia fructicola* and incubated in a moist chamber overnight. A group of 100 spores was examined and the number of spores germinated and not germinated was counted and recorded to show the fungicidal activity in terms of the percentage germination inhibition.

The following table reports the results obtained with various compounds of this invention. Also included for comparison are the results with an unsubstituted succinimide, N-(1,1,2,2-tetrachloroethylthio) succinimide, and N-(1,1,2,2-tetrachloroethylthio) glutarimide.

TABLE I

| Compound: | Percent inhibition |
|---|---|
| N-(1,1,2,2-tetrachloroethylthio)-2-allylsuccinimide | 90 |
| N-(1,1,2,2-tetrachloroethylthio)-2-(1-methyl-2-butenyl) succinimide | 100 |
| N-(1,1,2,2-tetrachloroethylthio)-2-(1-hexenyl) succinimide | 100 |
| N-(trichloromethylthio)-2-allylsuccinimide | 100 |
| Comparison Compounds: | |
| N-(1,1,2,2-tetrachloroethylthio) succinimide | 5 |
| N-(1,1,2,2-tetrachloroethylthio) glutarimide | 0 |

From the above it is obvious that the activity of the comparison fungicides drops off at significantly higher concentrations than does the activity of the invention compounds. And, these results show that the invention compounds have excellent activity at concentrations where the comparison compounds are ineffective.

In similar testing using *Alternaria solani* spores, N-(1,1,2,2 - tetrachloroethylthio) - 2 - allylsuccinimide showed 100% control at 1 p.p.m.; whereas, the corresponding unsubstituted succinimide and maleimide showed no control at 1 p.p.m.

Compounds of this invention were also tested for fungicidal activity in vivo. In these tests a formulation of the chemical to be tested was prepared as an aqueous suspension at the desired concentration. The suspensions were made uniform by means of an inert wetting agent and suitable filler. Replicate plants were used which were growing in standard UC soil mix. The following is a list of the plants used: beans (v. Idaho III)—for bean rust, cucumbers (v. National Pickling)—for powdery mildew, tomato (v. Bonney Best)—for tomato late blight. The plants were inoculated with an aqueous suspension of fungus spores and then incubated. After incubation disease readings were made by counting the number of local lesions on the primary leaves of each plant. These counts were compared with an unsprayed control series to find out the percent fungus control with fungitoxic chemical. The following organisms were used: cucumber powdery mildew—*Erysiphe cichoraceum*—35,000 spores/ml., tomato late blight—*Phytophthora infestans*—8,000 spores/ml., bean rust—*Uromyces phaseoli typica*—150,000 spores/ml.

The results of these tests are reported in Table II.

Aside from the specific formulation and application of the compounds of this invention as represented by the foregoing tests, they may be dispersed in or upon other appropriate biologically inert liquid and solid carriers. The solid carriers may be in the form of a dust, or used in conjunction with a suitable wetting agent to form a wettable powder. The fungitoxic compounds of the invention may also be formulated with other dispersing agents or emulsifying agents. Further, these compounds may not only be applied alone or in mixtures with other compounds of the disclosed class but may also be used in combination with other active toxicants in the formulation of fungicidal compositions.

The compounds may be applied to any environmental area which is a host to fungus or susceptible to fungus attack. For example, the fungicidal compositions may be sprayed or otherwise applied directly to a plant or other host, may be applied to the plant seed, sprayed upon the soil or other plant environment or used in similar ways so as to effect the control of fungus and fungus diseases.

As will be evident to those skilled in the art, various modifications of this invention can be made or followed, in the light of the foregoing disclosure and discussion, without departing from the spirit or scope of the disclosure or from the scope of the following claims.

I claim:
1. N-(polyhaloalkylthio)-2-alkenylsuccinimide in which the polyhaloalkyl group is of 1 to 2 carbon atoms and at least 3 halogen atoms, at least one of said halogens being bonded to the alpha carbon atom, and the alkenyl group is of 3 to 6 carbon atoms.
2. The N-(polyhaloalkylthio)-2-alkenylsuccinimide of claim 1 wherein the polyhaloalkyl group is 1,1,2,2-tetrachloroethyl.
3. The N-(polyhaloalkylthio)-2-alkenylsuccinimide of claim 1 wherein the polyhaloalkyl group is 1,1,2,2-tetrachloroethyl and the alkenyl group is allyl.
4. The N-(polyhaloalkylthio)-2-alkenylsuccinimide of claim 1 wherein the polyhaloalkyl group is 1,1,2,2-tetrachloroethyl and the alkyl group is 1-methyl-2-butenyl.
5. The N-(polyhaloalkylthio)-2-alkenylsuccinimide of claim 1 wherein the polyhaloalkyl group is 1,1,2,2-tetrachloroethyl and the alkenyl group is 1-hexenyl.

TABLE II

| Compound | Concentration, p.p.m. | Percent control | | |
|---|---|---|---|---|
| | | Erysiphe (cucumbers) | Uromyces (beans) | Phytophthora (tomato) |
| N-(1,1,2,2-tetrachloroethylthio)-2-allylsuccinimide | 100 | 42 | 74 | 90 |
| N-(1,1,2,2-tetrachloroethylthio)-2-(1-methyl-2-butenyl) succinimide | 100 | 84 | 90 | 98 |
| N-(1,1,2,2-tetrachloroethylthio)-2-(1-hexenyl)-succinimide | 100 | 88 | 74 | 93 |

References Cited

UNITED STATES PATENTS

| 2,553,770 | 5/1951 | Kittleson | 260—326.5 |
| 3,036,088 | 5/1962 | Harris | 260—326.5 |
| 3,178,447 | 4/1965 | Kohn | 260—326.5 |

HENRY R. JILES, *Primary Examiner.*

N. TROUSOF, *Assistant Examiner.*

U.S. Cl. X.R.

424—274